H. C. EGERTON.
SHOE.
APPLICATION FILED MAY 7, 1918.
1,370,797.
Patented Mar. 8, 1921.
2 SHEETS—SHEET 2.
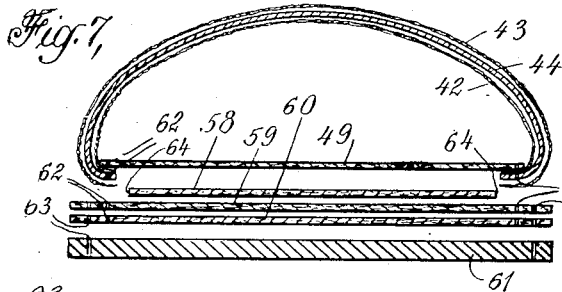
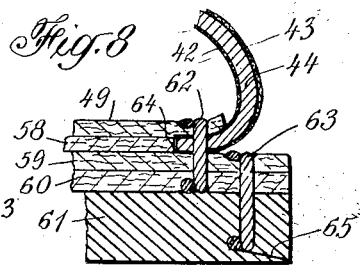
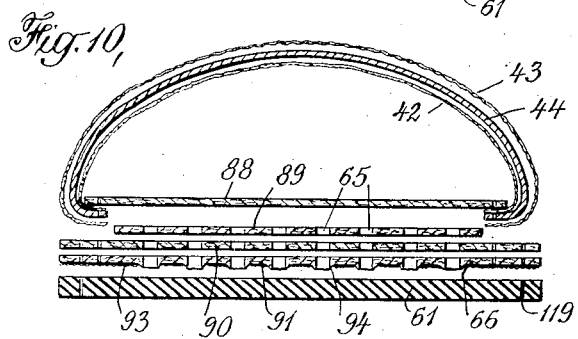
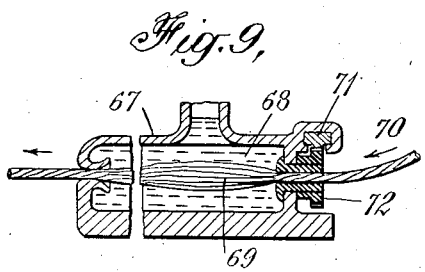
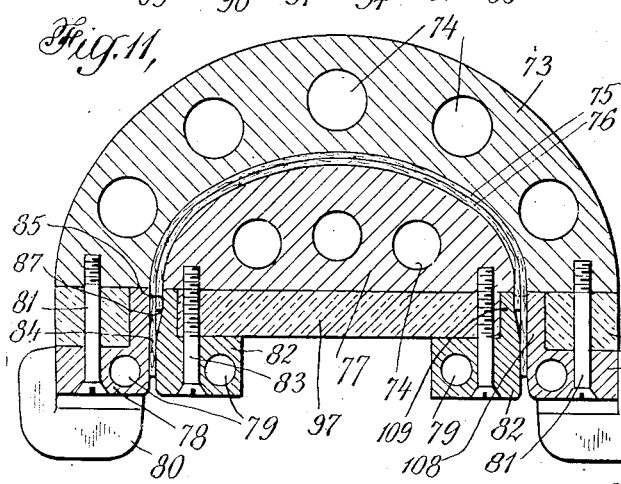
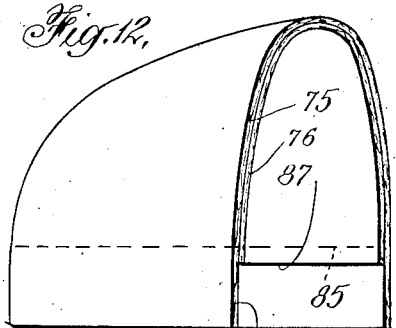
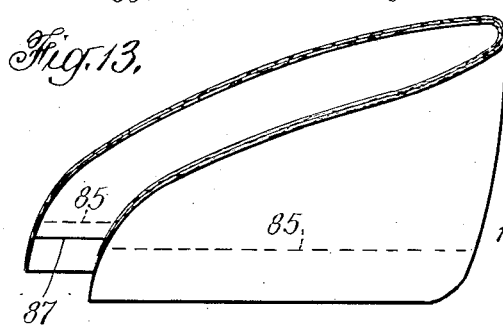
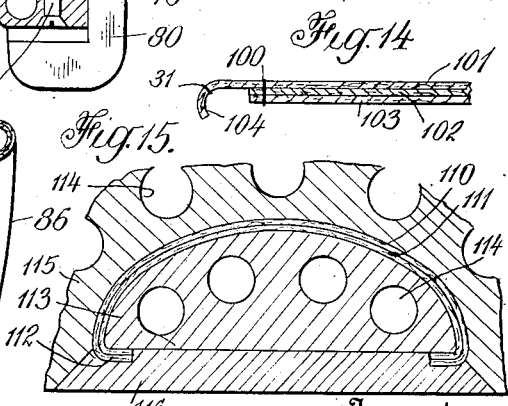
Inventor
Henry C. Egerton
By his Attorney
Harry L. Duncan ered this attachment, particularly if the said cementing material does not extend for the full width of these shoe elements. Shoe stiffening members of canvas or similar fabric impregnated with such phenolic condensation cementing material and having one or more layers cemented together and more or less cured or solidified may be incorporated in this way and toe boxes, counters and stiffening in-soles of this construction may be advantageously used in various types of shoe and boot construction, either in connection with leather, canvas or rubber shoe types. In many instances it is desirable to have these phenolic condensation impregnated shoe stiffening or connecting elements partly cured, so that attaching or connecting edges or portions are left in relatively soft uncured condition in which they may be stitched or otherwise attached or cemented to leather or rubber shoe elements, and in such cases the stitching thread may be coated or impregnated with similar phenolic condensation cementing material and subsequently cured to thoroughly cement the stitching and other parts together and greatly strengthen the connection and also waterproof the stitching and junction portions. In some instances it is advantageous to have such shoe stiffening elements as toe boxes which have been formed of one or more layers of canvas, paper or other fabric carrying or impregnated with such bakelite varnish or other phenolic condensation cementing material moderately cured or solidified throughout their entire extent, but left relatively flexible throughout their attaching or junction portions because of their containing less of this cementing stiffening material, thus rendering these attaching portions more readily penetrated during the stitching or other attachment of the shoe elements.

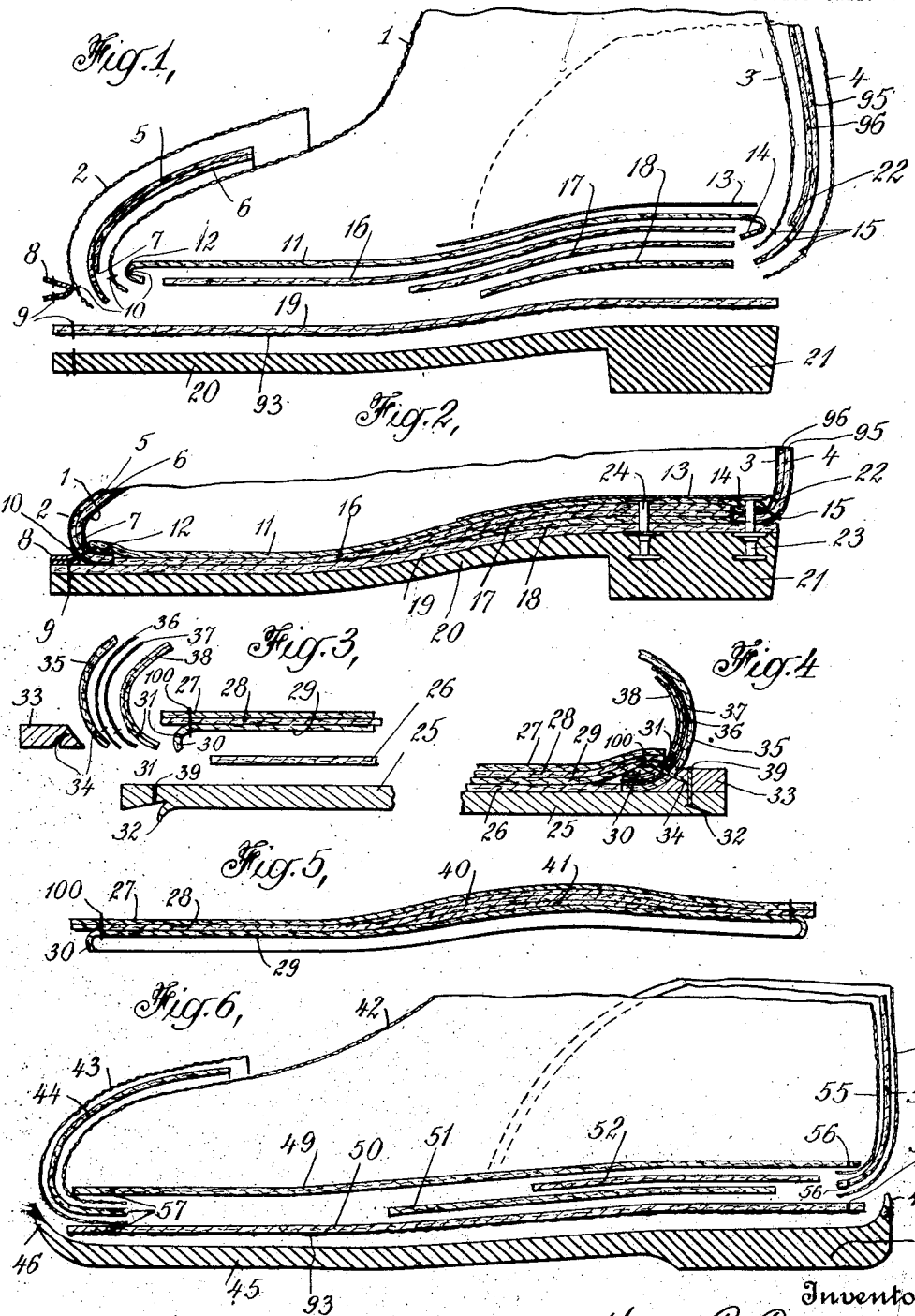

In the accompanying drawings showing in a somewhat diagrammatic way illustrative embodiments of this invention, Figure 1 is a longitudinal section showing in separated position the parts which may be used to form a shoe of this general character.

Fig. 2 is a partial longitudinal section through a completed shoe of this type.

Fig. 3 is a diagrammatic transverse section showing the parts of the sole construction of a leather shoe before the same is assembled.

Fig. 4 is a similar partial section of the completed shoe sole and Fig. 5 is a longitudinal section through the stiffening in-sole which may be used in connection therewith.

Fig. 6 is a longitudinal section showing in separated position the different parts which may be used to form a rubber soled canvas shoe of this character.

Fig. 7 is a transverse diagrammatic section showing in separated position the parts to form a leather soled shoe.

Fig. 8 is an enlarged partial section of the same after assembly.

Fig. 9 is a section through a thread impregnating or coating device.

Fig. 10 is a transverse section showing in separated position the parts which may be used to form a rubber soled shoe.

Fig. 11 shows the heating and curing devices to form a phenolic stiffened toe box.

Fig. 12 is a perspective view showing such a toe box.

Fig. 13 is a perspective view showing a similarly stiffened heel counter.

Fig. 14 is a partial transverse section showing another form of stiffening in-sole construction; and Fig. 15 is a transverse section showing another form of stiffened toe box and the curing dies therefor.

In the illustrative arrangement shown in Fig. 1, the upper 1 of any suitable material, such as waterproofed or coated canvas, for instance, may be reinforced adjacent the toe by a toe box formed of one or more thicknesses of heavy canvas or other fabric impregnated with phenolic condensation cementing material which may be cured at suitable heat for sufficient time to convert it into the solid permanent form throughout at least a considerable part of the toe box, the lower edges below about the point 7, where if desired, the material may have only a single thickness, being left in partly cured soft condition in which it is much more flexible and readily cemented to other phenolic impregnated elements. The upper part may, if desired, comprise several thicknesses of impregnated canvas or the like, such as 5, 6, to give ample strength and stiffness and the toe box may be covered by a toe cap 2 of any suitable material, such as coated or waterproofed canvas, if desired. A similarly impregnated and stiffened counter or heel stiffening member may be formed of a plurality of layers 95, 96 of phenolic impregnated canvas which may be cured in the upper part into the solid strong condition usually known as the moderate curing of such material, so as to retain the desired shape permanently while the lower part of this counter below about the point 22 may be formed of a single thickness of material which may for some purposes be advantageously left in the soft or partially cured condition. In lasting the shoe the upper, toe box, toe cap and counter may, for example, be stitched to the in-sole 11 of any suitable construction which may advantageously be formed of one or more layers of heavy fabric or canvas coated or impregnated with similar phenolic condensation cementing material which may be left in soft or uncured condition so that the parts may be bent readily inward to form an attaching flange 14 through which the lasting stitches may be secured along the lines 15 at the back of the shoe and along the dotted lines 10 at the toe. If desired, also, a welt strip, such as 8, of similarly impregnated heavy canvas or braided fabric, may be sewed into the front of the shoe by this lasting stitching and the welt strip may of course extend around the shoe about as far as the heel front as in ordinary leather shoe construction. The sole may be efficiently strengthened by incorporating therein a number of layers of such phenolic impregnated paper, cloth or other suitable material, preferably of a more or less fibrous character, and for instance a filler strip 16 of this material may be applied next the in-sole 11 and one or more other stiffening strips 17, 18 of generally similar character also applied in so far as desirable to further stiffen the shank portion of the sole. A sole connector strip 19 which may extend throughout substantially the entire area of the shoe sole may then be applied so as to be in contact with these inner layers or elements and to engage the inturned portions or edges of the lasted upper shoe elements. These sole layers or elements may all be securely and permanently united by compressing the parts and simultaneously curing or solidifying them by the necessary heat maintained for sufficient time to convert the phenolic condensation cementing material with which they are impregnated into the desired solid stiff form. The welt strip under these conditions may, of course, be compressed against the sole connector strip 19, as shown in Fig. 2, and this may leave a projecting edge of this sole connector to which a leather or other sole may be attached in any suitable way as by stitching extending substantially along the line 9—9 around these elements. It is sometimes advantageous, however, to simultaneously connect a rubber composition sole, such as 20, which may have the integral heel 21 to the other parts at the same time that the various phenolic condensation cementing material is cured. For this purpose it is usually desirable to have the sole connector 19 provided with a layer or coating of frictioned rubber composition which may be worked into the coarsely woven canvas or other fabric before it is impregnated or coated on its other side with the phenolic condensation material, such as bakelite varnish, although of course in some cases it may be desirable to simultaneously apply the frictioned or other rubber coating to one side of the fabric and the phenolic condensation cementing material to the other. Where a rubber heel is to be attached in this way it is desirable to provide suitable interlocking connecting members, such as the heel rivets 23, 24, which may extend up through the in-sole elements and be headed over inside of the same and have projecting headed portions to enter the rubber heel and interlock therewith during the vulcanizing process so as to insure permanent connection under the hard service conditions to which they are liable. It is also desirable to have a cemented liner strip, such as 13, cover these rivets and be cemented in place to the other in-sole elements during the curing and vulcanizing process which takes place in suitable heated molds capable of holding parts together and exerting thereon the desired degree of compression.

The curing of the bakelite or other phenolic condensation cementing material may be carried out at varying temperatures and complete curing can in most cases where relatively thin layers or blocks are being treated be effected in half an hour or an hour or so at temperatures around 300 degrees Fahrenheit. This corresponds quite closely with the vulcanizing temperatures of rubber sole compositions commercially used which can of course be regulated by the incorporation of different proportions of various accelerators or special vulcanizing agents and as well known the time of vulcanizing of these compositions can be retarded when desired by the incorporation of more of the inert weighting or mineral loading materials. In this way a single heat treatment under pressure may be used to vulcanize in place the rubber sole with or without the heel of the shoe and to permanently unite and shape up the sole reinforcing and connecting cementing material of this general character.

Fig. 3 shows an arrangement suitable for use with a leather sole, such as 25, which may be formed with a stitching channel shown in open position in which the feather 32 is turned out from the sole to provide a lip. The upper elements may comprise a toe box 38 of any suitable material and construction either of shaped and hardened leather or of canvas or other fabric impregnated with phenolic condensation cementing material and suitably cured to convert it into the solid condition after the shoe stiffening element has been given its desired shape, the lower edge being preferably left in partly or wholly uncured condition so as to give greater flexibility and increased softness to facilitate the lasting stitching thereof. If desired, a stiffening in-sole may be advantageously used in this connection and may be formed of a plurality of layers of bakelite impregnated canvas or other fabric, such as 27, 28, 29, one or more of the lower layers being, if desired, bent down around the edge to form the attaching portion or lip 30 inside the connecting stitching 100 indicated in Fig. 5. Additional stiffening and strengthening layers 40, 41 may be placed adjacent the shank portion of the in-sole to give it added strength. This element may be cured or hardened under pressure in suitable molds which preferably finally cure and stiffen the central or main portion of this stiffening in-sole while leaving the attaching edge in partially cured soft condition in which it has only part of the strength and stiffness of a similarly impregnated strip which has been wholly cured. The shoe upper 35 may be of ordinary leather in this instance and may have interposed between it and the toe box 38 one or more layers of the usual canton flannel or other cushioning layers 36, 37, although this is not of course so necessary in the case of a smoothly molded fabric impregnated toe box as where the ordinary leather toe box is used. The welt strip 33 may be of leather in this instance and may be formed with the usual stitching channel 34, the lasting stitching extending through this channel and through the lower edges of the other elements along about the lines 31 indicated in Fig. 3. After this lasting operation the attaching edge 30 of the in-sole may be bent inward against the adjacent inner portion of the in-sole and a filler strip, such as 26, of felt, cork or any other suitable material may be inserted to fill this space and then the parts may be pressed and shaped under moderate heat of 150° to 180° Fahrenheit, more or less, to partially melt or soften the relatively uncured portions of the phenolic impregnated fabric and force them together and generally smoth out and flatten the different elements so that they assume more nearly the position diagrammatically indicated in Fig. 4. The leather sole 25 may then be attached in any suitable way to the welt 33 as by the sole stitching 39, the feather 32 being cemented and closed with phenolic condensation cementing material, if desired. Since such material can be cured or hardened by prolonged exposure to moderate heats such as do not injure leather, the final curing may, if desired, be given to such phenolic impregnated fabric elements as described, or to the lasting or sole stitching where the stitching thread has been coated or impregnated with such phenolic condensation cementing material, by a prolonged moderate drying or heating of the shoe at temperatures of 120° to 150° Fahrenheit or so, a number of hours or days of such drying treatment being advantageous to the finished shoe and serving to strongly and permanently connect the parts together by the thorough curing of the phenolic condensation cementing material employed in the various elements. Another desirable form of edge construction for such stiffening in-sole is shown in Fig. 14 in which the upper layer 101 of bakelite impregnated heavy duck or the like may have an extended edge 104 which may be bent downward to form the attaching edge through which the lasting stitching may pass at about the point 31. Additional layers of similar impregnated fabric may be applied to either or both sides of this layer and if desired the impregnated layers 102, 103 may be located below the layer 101 and joined thereto by connecting stitching 100 adjacent the edge of these superimposed layers. In the preliminary curing of such a stiffening in-sole the curing may be substantially complete throughout the multiple thickness portion where the stiffening member may have two or three thicknesses leaving the relatively thinner edge in partially cured or uncured condition until after the lasting stitching has connected the other shoe elements thereto. Good results in making such sole stiffening or upper stiffening members in this way may be secured by thoroughly impregnating or filling heavy canvas with No. 1 bakelite varnish as by repeatedly immersing the canvas therein and running it through pressure rolls for such purposes. Two plies of heavy cotton duck give good results for general purposes when something equivalent to eight ounce army duck is used for these two layers. They may be thoroughly and strongly united by first impregnating them with phenolic condensation cementing material of this character and then curing or uniting them by heat after they have been forced directly together so as to preferably give as in the other cases, what is known as the intermediate curing or hardening of such phenolic cementing material, as is known as bakelite varnish. Good results can usually be secured by curing such material under pressure at temperatures of about 300° or so Fahrenheit for an hour or so, and when two such layers of duck are cured in this way they can be thoroughly united into a quite smooth, hard, strong sheet about $\frac{1}{16}$th of an inch thick which contains some fifty per cent. by weight of the cured phenolic condensation cementing material. The resistance of such a compound sheet stiffening element a sixteenth of an inch thick can be appreciated by considering that a relatively narrow strip can be bent from a straight form into a circle of two or three inches diameter without cracking or serious injury, and also that the bending modulus of rupture corresponds to 15,000 to 18,000 pounds or so per square inch. Such cured stiffening elements formed of cloth, paper or other fibrous material carrying phenolic condensation cementing material are permanently stiff and strong and are practically independent of any ordinary heat changes to which footwear is properly subjected which is in marked contrast to the softening of pyroxylin or similar cementing material when moderately heated and its tendency to crack when chilled.

A suitable arrangement for rubber soled shoes is indicated in Fig. 6 as comprising the upper 42 which may be of canvas and coated or waterproofed with rubber composition or any other suitable material, if desired, and having the edge portions turned down over the in-sole 49 which may consist of one or more layers of fabric impregnated with such phenolic condensation cementing material. If desired additional toe and heel stiffening elements may be employed, although this is not in all cases necessary. In Fig. 6 a toe box 44 is indicated as having its lower edge turned inward around the insole 49 and this toe box may be formed of one or more layers of canvas or other suitable fabric impregnated and stiffened with incorporated phenolic condensation cementing material which may be preliminarily cured or solidified throughout the upper portion of this toe box while preferably leaving the lower edge in relatively soft uncured condition, and the toe cap 43 may be used to cover the toe box, if desired, and the heel stiffening element 54 formed in a generally similar way into the shaped shank may be arranged outside the heel portion 55 of the upper and inclosed within the covering layer 53 of canvas or the like at the heel. It is in some cases advantageous, however to have these impregnated in-sole and upper stiffening elements in soft, uncured condition when they are assembled and preliminarily attached so that they can be more effectively cemented together during the curing operation. In lasting these elements together the upper and adjacent element may be clamped or otherwise secured to the last as by suitable inclosing straps or clamping members and the edge portions brought down over the in-sole 43 and arranged or preliminarily secured in suitable position as by occasionally tacking or riveting and then one or more additional strips of similarly impregnated or coated fabric, such as canvas, paper, etc.; 50, 51, 52 may be arranged in contact with the in-sole 49 and the whole cured and simultaneously vulcanized to a rubber sole and heel 45, 47, in a suitable vulcanizing and curing mold. The preliminary tacking may, of course, connect all of these stiffening or in-sole members and may take place along about the lines 56, 57, where it is desired to preliminarily tack or connect the sole connector 50 and the other parts within. It is also desirable to provide the sole connector 50 which is preferably of heavy canvas or similar fabric with a suitable rubber coating or friction layer 93 on its lower surface next the rubber sole to facilitate the vulcanizing connection therewith, although this is not in all cases necessary. Reduced thickness edge portions, such as 46, 48, may be formed on the edges of the rubber sole to more or less lap up against the upper members or layers and be vulcanized thereto during the final curing operation.

Fig. 7 shows another generally similar arrangement in which the toe cap 43, to box 44 and upper 42, may extend at their edges beneath a bakelized fabric in-sole 49 which may be in soft, uncured condition when these elements are brought around the same and tacked or temporarily secured in the desired position either before or after the other impregnated layers 58, 59 and 60 are brought into contact therewith. The filling layer 58 which may be of similarly impregnated material, if desired, preferably has its edges 64 extending out substantially into contact with the inner edges of the upper and toe box. The preliminary tacking may, if desired, extend substantially along the lines 62 and may consist of relatively few soft metal rivets or tacks to hold the parts together, or they may be temporarily retained by edge clamping members until all of the parts are forced together under pressure in a suitably heated mold which cures and connects all of these impregnated parts through the solidification of the incorporated phenolic condensation material with which they are coated or impregnated. In some cases after the parts have been preliminarily tacked or secured they may be sewed together with lasting stitching along the line 62, as is shown in greater detail in Fig. 8 and then the lasted parts may be cured in the mold as previously described before the leather or other sole 61 is attached thereto as by the sole stitching 63 which may extend into the sewing channel 65 in the sole. It is in many instances advantageous to have lasting and sole stitching thread impregnated or coated with phenolic condensation cementing material and this may be conveniently effected by treating the thread just before it is used in a suitable impregnating device, such as is indicated in Fig. 9 in which the tank 67 is filled with bakelite varnish or other suitable phenolic condensation cementing material 68 and the thread 70 passes through this tank so as to be coated and more or less impregnated with this material before it passes to the needle of the sewing machine. It is usually advantageous to more or less open up a thread during this process to more thoroughly impregnate its fibers with the cementing material and this may be effected by leading the thread through an oscillating bushing such as 72 which engages the thread sufficiently to twist it in unison with the bushing which may be oscillated as by the rack 71 engaging the gear formed on the periphery of this bushing and moved intermittently by connection with any oscillating part of the sewing machine, for instance. Such impregnated sewing thread used for hand sewing of shoes or the like carries considerable phenolic condensation cementing material into the stitching holes and especially where passing through similarly impregnated shoe elements strongly and permanently unites therewith when this cementing material is cured by any suitable heat treatment. Of course sewing thread may be otherwise impregnated and may be conveniently formed with reduced or pointed stiffened ends by scraping or reducing the impregnated thread end and then curing it in any way at considerable heat which sufficiently stiffens it to make it serviceable as an inserting end. Cementing material of this character when used on thread in sufficient amounts also has an important cementing action on many kinds of leather through which such thread is sewed as well as effecting a very marked increase in the strength of the stitching thread itself. Such a shoe as is indicated in Figs. 7 and 8 may be sewed with such impregnated thread and whether the sole is of leather or rubber may be subjected to a prolonged low temperature curing heat of 120° to 150° Fahrenheit for leather or considerably higher heats of correspondingly less duration where the sole is of rubber so as to thoroughly cure the stitching and any other parts of the phenolic impregnated material which have not been previously cured.

Fig. 10 shows another arrangement which is particularly adapted for rubber sole shoes, the upper 42 and also the toe box 44 and toe cap 43, if desired, being tacked or attached to the in-sole 88 of bakelite impregnated duck or fabric and cemented or attached to other layers of similarly impregnated material 89, 90, 91 which may, if desired, have been previously partially cured and formed with connecting apertures or holes 65 extending therethrough and preferably on the bottom layer having projections, such as 94, around the holes. This bottom layer or sole connector 91 may be formed with a layer of frictioned rubber 93 and after the parts have been assembled they may be clamped together in a suitable curing mold in connection with a soft rubber sole 61 which may be simultaneously vulcanized and attached to the sole connector while the phenolic condensation cementing material is being cured. The pressure of the vulcanizing mold may be sufficient to cause the rubber sole to more or less flow or be forced into the connecting holes 65 so as to be interlocked or embedded within these layers of material and suitably promote the strength of union of these parts. In some cases the sole may be stitched around the edges to the other parts along about the line 119 which can of course be resorted to in resoling such shoes after the original rubber sole has been more or less worn off. In such cases the original rubber sole may be cut or pared off in a substantially uniform manner and then the shoe sole may be coated with rubber or other adhesive cement and the rubber sole secured in position and then stitched to the extension sole as previously described.

A suitable molding and curing apparatus for forming these shoe stiffening elements of bakelite impregnated fabric and leaving relatively soft uncured edge portions thereof is shown in Fig. 11 as comprising the outer mold 73 of iron or other metal which may have its inner surface shaped to conform to the toe cap, heel counter or other part to be formed. Suitable heating pipes or openings 74 may be formed in this mold and connected to steam or other supply pipes to keep the mold at the desired heat, the conductivity of the mold insuring of course substantially uniform heating throughout the entire working face thereof. This heat conductivity may of course be suitably controlled adjacent the edge portions of the stiffening elements which are left preliminary in relatively soft uncured condition and one arrangement for effecting this is shown in Fig. 11 as comprising a suitable small area neck or projection 108 which may be either integral with the main mold element or as a separate metallic member screwed or otherwise secured thereto as by the screws or bolts 81. This minimizes the conduction of heat along this part of the mold surface and this may be further cut down by the use of suitable heat insulating material, such as the layer of asbestos 98 interposed between these two parts. Various cooling devices may be employed to cool the outer portion of the mold, such as suitably projecting cooling flanges 80, or cooling pipes 79, which can keep this outer portion of the mold face beyond about the dotted line 85 at the desired lower temperature. One or more layers of bakelite impregnated fabric, such as 75, 76, may be inserted in this mold and forced into the curved convex shape desired when the inner mold 77 is forced home and held tightly in position, and by maintaining the central part of the mold surface at somewhat over 300° Fahrenheit for a twenty or thirty minutes treatment, for example, the bakelite cementing material may be substantially completely cured and solidified and if during this period the edge portions beyond about the dotted line 85 are kept at 100° or 120° Fahrenheit, very little curing action will take place, although the parts will be permanently connected throughout this area while left in relatively flexible soft condition. If, however, through the use of cooling liquid or the like these outer edge portions of the mold are kept at temperatures of 50° or 80° Fahrenheit or so, no substantial curing action takes place at all and the material is in its raw, uncured condition in which it still more readily adheres and unites with any other similar material during subsequent heat curing of the parts. Of course the inner mold section 77 may be formed with similar heating pipes 74 and with a similar reduced conduction neck or fin 109 so as to keep at relatively low temperature the outer edge portion 82 of this mold which may be screwed to the main mold element by screws or bolts 83. Similar cooling pipes 79 may extend through this mold element to completely regulate its temperature, if desired. The toe box produced in this way is diagrammatically indicated in Fig. 12; the part above the dotted line 85 may if desired be completely cured and permanently shaped so as to be strong and to retain its smooth surface finish, and the lower edge portions which may be one or two layers thick as preferred, may be either in partly cured, or entirely uncured condition. The inner layer of impregnated fabric may have its lower edge at about the point 87 below the line of complete curing in some cases and the single outer layer 84 may be with advantage in some cases completely uncured to give still greater flexibility and adhesive cementing action when forced into contact with other impregnated fabric. Fig. 13 shows a heel counter of generally similar construction, the outer layer 86 being thus cemented to the inner layer 87 which may terminate somewhat below the line 85 which is about the limit of complete curing of the bakelite composition.

Fig. 15 shows another form of toe box and curing mold therefor, this toe box being formed, if desired, of a plurality of layers 110, 111 of bakelite impregnated canvas or other fabric. This material may be inserted in the outer mold 115 and shaped by forcing home the inner mold 113. Then the edge portions 112 which may in some instances comprise a less number of layers of fabric, may be bent over and forced into final position by a supplemental mold section 116. This may, if desired, much more highly compress these edge portions 112 so as to express therefrom a considerable proportion of the original bakelite cementing material which they carry, or these edge portions may only have originally applied or incorporated therewith a relatively small proportion of such cementing material. The toe box may be cured by the heat of the mold supplied by various heating pipes or channels 114 and when the curing is completed the mold sections and toe box may be separated, leaving the toe box thoroughly cured and stiffened in its desired permanent shape while the attaching edge portions 112 are relatively soft and yielding because of the less proportion of cementing material they contain and are thus more readily penetrated or pierced during stitching or other attaching operation uniting them to the cooperating shoe elements.

This invention has been described in connection with a number of illustrative embodiments, forms, proportions, elements, parts, shapes, materials, compositions, methods of preparation, production and use, to the details of which disclosure the invention is not of course to be limited, since what is claimed as new and what is desired to be secured by Letters Patent is set forth in the appended claims:

1. The shoe comprising an upper and a fabric upper, a toe box comprising a plurality of layers of fabric cemented together by impregnating phenolic condensation cementing material which has been preliminarily shaped, cured and solidified throughout the upper portion of the toe box while the lower edge portions thereof are relatively uncured and flexible when the shoe is assembled, a toe cap inclosing said toe box, a heel stiffener formed of a plurality of layers of fabric cemented together with impregating phenolic condensation cementing material which has been preliminarily substantially shaped, cured and solidified at the upper part while the lower part thereof is in relatively flexible uncured condition when the shoe is assembled, an in-sole of fabric coated and impregnated with phenolic condensation cementing material and having a downwardly bent flexible attaching edge, a phenolic impregnated welt strip extending around the front portion of the shoe, lasting stitching threads impregnated with phenolic condensation cementing material connecting said welt strip, toe cap, toe box, upper, and heel stiffener to said in-sole, a sole connector having a friction coating of rubber on its lower surface and impregnated with phenolic condensation cementing material and stiffener strips of phenolic impregnated fabric interposed between said sole connector and insole, the coöperating portions of said shoe elements being heat cured together under pressure to form a unitary stiffened shoe construction and a rubber composition sole and heel attached to said sole connector by stitching thread impregnated with phenolic condensation cementing material, said sole being vulcanized to said sole connector and vulcanized during the curing and cementing of said shoe construction.

2. The shoe comprising a fabric upper, a toe box comprising a plurality of layers of fabric cemented together by impregnating phenolic condensation cementing material which has been preliminarily shaped, cured and solidified throughout the upper portion of the toe box while the lower edge portions thereof are relatively uncured and flexible when the shoe is assembled, a toe cap inclosing said toe box, a heel stiffener formed of a plurality of layers of fabric cemented together with impregnating phenolic condensation cementing material which has been preliminarily substantially shaped, cured and solidified at the upper part while the lower part thereof is in relatively flexible uncured condition when the shoe is assembled, an in-sole of fabric coated and impregnated with phenolic condensation cementing material and having a downwardly bent flexible attaching edge, a phenolic impregnated welt strip extending around the front portion of the shoe, lasting stitching connecting said welt strip, toe cap, toe box, upper and heel stiffener to said in-sole, a sole connector impregnated with phenolic condensation cementing material and stiffener strips of phenolic impregnated fabric interposed between said sole connector and insole, the coöperating portions of said shoe elements being heat cured together under pressure to form a unitary stiffened shoe construction and a sole and heel attached to said sole connector.

3. The shoe comprising a fabric upper, a heel stiffener formed of fabric carrying phenolic condensation cementing material which has been preliminarily substantially completely cured and solidified at the upper part of the shank while the lower part thereof is in relatively flexible uncured condition when the shoe is assembled, an in-sole of fabric carrying phenolic condensation cementing material, a phenolic impregnated welt strip extending around the front portion of the shoe, lasting stitching connecting said shoe elements, a sole connector impregnated with phenolic condensation cementing material, said shoe parts being heat cured together under pressure to form a unitary stiffened shoe construction and a rubber composition sole and heel attached to said sole connector.

4. The shoe comprising a fabric upper, a heel stiffener formed of fabric carrying phenolic condensation cementing material which is in relatively flexible uncured condition in the lower part of the stiffener when the shoe is assembled, an in-sole of fabric carrying phenolic condensation cementing material, a welt strip extending around the front portion of the shoe, lasting stitching connecting said shoe elements, a sole connector impregnated with phenolic condensation cementing material, said shoe parts being heat cured together under pressure to form a unitary stiffened shoe construction.

5. The shoe comprising an upper and coöperating shoe stiffening elements having previously shaped stiff portions and having relatively flexible fabric connecting portions coated or impregnated with relatively uncured phenolic condensation material and preliminarily connected by stitching threads in contact with phenolic condensation cementing material, such elements and threads being cemented together by the curing and solidifying of such phenolic condensation cementing material.

6. The shoe comprising an upper and coöperating shoe stiffening elements having previously shaped stiff portions and having relatively flexible fabric connecting portions coated or impregnated with relatively uncured phenolic condensation cementing material and preliminarily connected, such elements being cemented together by the curing and solidifying of such phenolic condensation cementing material.

7. The shoe comprising an upper and coöperating shoe elements having fabric connecting portions coated with relatively uncured phenolic condensation cementing material and preliminarily connected, such elements being cemented together by the curing and solidifying of such phenolic condensation cementing material.

8. The shoe comprising an upper and coöperating shoe stiffening elements having fabric connecting portions in which is incorporated relatively uncured phenolic condensation cementing material and preliminarily connected by lasting stitching threads impregnated with phenolic condensation cementing material, such elements and threads being cemented together by the curing and solidifying of such phenolic condensation cementing material.

9. The shoe comprising an upper and coöperating shoe stiffening elements having fabric connecting portions in which is incorporated relatively uncured phenolic condensation cementing material and such elements being cemented together by the curing and solidifying of such phenolic condensation cementing material.

10. The shoe comprising an upper and coöperating shoe stiffening elements having connecting portions between which is interposed relatively uncured phenolic condensation cementing material and such elements being cemented by the curing and solidifying of such phenolic condensation cementing material.

11. The shoe comprising elements having connecting portions preliminarily connected by stitching threads impregnated with phenolic condensation cementing material, such elements and threads being cemented together by the curing and solidifying of such phenolic condensation cementing material.

12. The shoe comprising elements having connecting portions connected by stitching threads having phenolic condensation cementing material in contact therewith, such elements and threads being cemented together by the curing and solidifying of such phenolic condensation cementing material.

13. The shoe comprising elements having connecting portions connected by stitching threads having phenolic condensation cementing material in contact therewith, such threads being strengthened by the curing and solidifying of such phenolic condensation cementing material.

14. The shoe comprising shoe stiffening elements having fabric connecting portions impregnated with relatively uncured phenolic condensation cementing material and preliminarily connected by stitching threads impregnated with phenolic condensation cementing material, such elements and threads being cemented together by the curing and solidifying of such phenolic condensation cementing material.

15. The shoe comprising shoe stiffening elements having fabric connecting portions impregnated with relatively uncured phenolic condensation cementing material and preliminarily connected, such elements being cemented by the curing and solidifying of such phenolic condensation cementing material.

16. The shoe comprising a fabric upper and coöperating shoe stiffening elements comprising a fibrous sole stiffener, said upper and stiffening elements having coöperating connecting portions carrying and impregnated with cured phenolic condensation cementing material to connect and stiffen them, a fabric sole connector connected to said sole stiffener by such phenolic condensation cementing material and a valcanized rubber composition sole and heel vulcanized to said sole connector.

17. The shoe comprising a fabric upper and coöperating shoe stiffening elements comprising a fibrous sole stiffener, said upper and stiffening elements having coöperating connecting portions carrying cured phenolic condensation cementing material to connect and stiffen them, a sole connector connected to said sole stiffener by such phenolic condensation cementing material and a vulcanized rubber composition sole secured to said sole connector.

18. The shoe comprising a fabric upper and coöperating shoe stiffening elements comprising a fibrous sole stiffener, said upper and stiffening elements having coöperating connecting portions carrying and impregnated with cured phenolic condensation cementing material to connect and stiffen them, and a vulcanized rubber composition sole secured to said sole stiffener.

19. The shoe comprising a fabric upper and coöperating shoe stiffening elements comprising a sole stiffener, said upper and stiffening elements having coöperating connecting portions carrying cured phenolic condensation cementing material to connect and stiffen them, and a connected vulcanized rubber composition sole.

20. The shoe comprising an upper and coöperating shoe stiffening elements comprising a fibrous sole stiffener, said upper and stiffening elements having coöperating connecting portions carrying cured phenolic condensation cementing material to connect and stiffen them and a rubberized sole connector connected to said sole stiffener by such phenolic condensation cementing material.

21. The shoe comprising an upper and coöperating shoe stiffening elements comprising a fibrous sole stiffener, said stiffening elements having coöperating connecting portions carrying cured phenolic condensation cementing material to connect and stiffen them.

22. The shoe comprising a fabric upper and coöperating shoe stiffening elements comprising a fibrous sole stiffener, said upper and stiffening elements having coöperating connecting portions preliminarily connected by stitching threads carrying phenolic condensation cementing material, and being impregnated with cured phenolic condensation cementing material to connect and stiffen them and a connected rubber composition sole.

23. The shoe comprising shoe stiffening elements comprising a fibrous stiffener, said stiffening elements having coöperating connecting portions preliminarily connected by stitching threads carrying phenolic condensation cementing material and being impregnated with cured phenolic condensation cementing material to connect and stiffen them.

24. The shoe comprising shoe stiffening elements having coöperating connecting portions preliminarily connected by stitching threads and being impregnated with cured phenolic condensation cementing material to connect and stiffen them.

25. The shoe comprising shoe stiffening elements having coöperating connecting portions and being impregnated with cured phenolic condensation cementing material to connect and stiffen them.

HENRY C. EGERTON.